United States Patent
Bhella

(10) Patent No.: US 12,518,116 B2
(45) Date of Patent: Jan. 6, 2026

(54) SCANNER CONFIGURATION USING ADVANCED DATA FORMATTING SYSTEMS AND METHODS

(71) Applicant: Zebra Technologies Corporation, Lincolnshire, IL (US)

(72) Inventor: Kenneth S. Bhella, Stony Brook, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/880,526

(22) PCT Filed: Apr. 27, 2023

(86) PCT No.: PCT/US2023/020176
§ 371 (c)(1),
(2) Date: Dec. 31, 2024

(87) PCT Pub. No.: WO2023/215172
PCT Pub. Date: Nov. 9, 2023

(65) Prior Publication Data
US 2025/0245456 A1 Jul. 31, 2025

Related U.S. Application Data

(60) Provisional application No. 63/337,277, filed on May 2, 2022.

(51) Int. Cl.
*G06K 7/10* (2006.01)
*G06K 7/00* (2006.01)
*G06K 7/14* (2006.01)

(52) U.S. Cl.
CPC ....... *G06K 7/10821* (2013.01); *G06K 7/1413* (2013.01)

(58) Field of Classification Search
CPC .................. G06K 7/0004; G06K 7/10821
USPC .................................................. 235/462.01
See application file for complete search history.

(56) References Cited

U.S. PATENT DOCUMENTS

2015/0293592 A1* 10/2015 Cheong ................... G06F 1/163
345/173

* cited by examiner

Primary Examiner — Toan C Ly
(74) Attorney, Agent, or Firm — Yuri Astvatsaturov

(57) ABSTRACT

Systems and methods are described for scanner configuration using advanced data formatting (ADF). Example systems and methods comprise selecting from a GUI an ADF rule or otherwise a configuration instruction, option, or feature. A host application executing on one or more processors, configures a barcode reader based on the ADF configuration as selected. The scanner may then be operated or controlled based on the updated ADF configuration.

4 Claims, 9 Drawing Sheets

300

| Number | # Of Beeps | Frequency | Duration |
|---|---|---|---|
| 1 | 1 | High | Short |
| 2 | 2 | High | Short |
| 3 | 3 | High | Short |
| 4 | 4 | High | Short |
| 5 | 5 | High | Short |
| 6 | 1 | Low | Short |
| 7 | 2 | Low | Short |
| 8 | 3 | Low | Short |
| 9 | 4 | Low | Short |
| 10 | 5 | Low | Short |
| 11 | 1 | High | Long |
| 12 | 2 | High | Long |
| 13 | 3 | High | Long |
| 14 | 4 | High | Long |
| 15 | 5 | High | Long |
| 16 | 1 | Low | Long |
| 17 | 2 | Low | Long |
| 18 | 3 | Low | Long |
| 19 | 4 | Low | Long |
| 20 | 5 | Low | Long |
| 21 | 4 | High-Low-High-Low | Short |
| 22 | 4 | High-Low-High-Low | Long |
| 23 | 2 | High-Low | Short |
| 24 | 2 | Low-High | Short |
| 25 | 3 | High-Low-High | Short |
| 26 | 3 | Low-High-Low | Short |
| 27 | 4 | High-High-Low-Low | Short |

| Options To Exclude From Output | Description |
|---|---|
| Non Printable | Non Printable ASCII Value |
| Whitespace | Tabs, Spaces, Line Feeds, Vertical Tabs, Carriage Returns |
| Numeric | Values 0 To 9 |
| Alpha | Values A To Z And a To z |
| Other | ASCII Values Greater Than 127 |
| Special | All Other Special Characters |
| Custom | Category Assigned By User TO A Limited Number Of Characters |

FIG. 6

SCANNER CONFIGURATION USING ADVANCED DATA FORMATTING SYSTEMS AND METHODS

BACKGROUND

Conventional scanners are used to scan information for a variety of products where data can be scanned from barcodes and the like. Such data can be formatted by a scanner before transmission to a host application. Each scanner may have a different communication protocol for each cable or communication path, which, in turn, can require a different data format based on the scanner and/or host application. For example, a given host application may be configured to recognize scanning from a certain scanner that uses a specific communication protocol or data format specific to that that application. Such software applications and scanners are typically fixed in a proprietary manner when they are initially manufactured or installed on site. Thus the scanners and host applications can be tightly coupled, requiring proprietary installation for technical and compatibility reasons.

A problem arises, however, when a given scanner needs to be changed or updated, as the scanner and/or its related system typically requires manual alterations that require a skilled technician in order to differently configure the scanner to adapt as the device is used with new or different protocols, data communications, and/or other features desired or needed for a given host application or computer system.

Accordingly, there is a need to adapt the scanner's configuration using advanced data formatting systems and methods, as described herein.

SUMMARY

User Feedback Control.

In one aspect, the present disclosure describes a barcode reader comprising: a housing; an image-acquisition assembly positioned at least partially within the housing and having a field of view (FOV), the image-acquisition assembly operable to capture image data associated with an environment appearing within FOV; a user-feedback assembly operable to provide a plurality of user-feedback responses; and a controller communicatively coupled to the image-acquisition assembly and to the user-feedback assembly, the controller configured to decode indicia appearing in the image data, wherein: the barcode reader is configurable to alternatively operate in one of at least two modes; in a first mode of the at least two modes the controller is configured to (i) instruct the user-feedback assembly to generate a first type of user-feedback response responsive to successfully decoding a first type of indicia, and (ii) instruct the user-feedback assembly to generate the first type of user-feedback response responsive to successfully decoding a second type of indicia; in a second mode of the at least two modes the controller is configured to (i) instruct the user-feedback assembly to generate a second type of user-feedback response responsive to successfully decoding the first type of indicia and (ii) instruct the user-feedback assembly to generate a third type of user-feedback response responsive to successfully decoding the second type of indicia; the first type of indicia is different from the second type of indicia; the second type of user-feedback response is different from the third type of user-feedback response; the second type of user-feedback response is one of different from or same as the first type of user-feedback response responsive; and a parameter(s) for defining the first type of indicia and the second type of indicia being at least one of predefined within the controller or user-defined.

Output Asset Tracking Information.

In an additional aspect, the present disclosure describes a barcode reader comprising: a housing; an image-acquisition assembly positioned at least partially within the housing and having a field of view (FOV), the image-acquisition assembly operable to capture image data associated with an environment appearing within FOV; a memory storing at least one barcode reader-specific parameter; a communication module configured to transmit data to an external device; a controller communicatively coupled to the image-acquisition assembly, the communication module, and the memory, the controller configured to decode indicia appearing in the image data, wherein: the barcode reader is configurable to alternatively operate in one of at least two modes; in a first mode of the at least two modes the controller is configured to, responsive to successfully decoding an indicium in the image data, transmit, via the communication module, a first message to the external device, the first message including at least a portion of a payload associated with the indicium and excluding the at least one barcode reader-specific parameter; and in a second mode of the at least two modes the controller is configured to, responsive to successfully decoding the indicium in the image data, transmit, via the communication module, a second message to the external device, the second message including the at least a portion of the payload associated with the indicium and the at least one barcode reader-specific parameter.

Change Input Source.

In an additional aspect, the present disclosure describes a system comprising: a barcode reader including: a barcode reader housing; an image-acquisition assembly positioned at least partially within the barcode reader housing and having a field of view (FOV), the image-acquisition assembly operable to capture image data associated with an environment appearing within FOV; a barcode reader communication module configured to transmit data to an external device; and a barcode reader controller communicatively coupled to the image-acquisition assembly and the communication module, the barcode reader controller configured to decode indicia appearing in the image data; and a printer including: a printer housing; a media-processing assembly configured to process print media in accordance with print instructions; a printer communication module configured to receive data from another external device; and a printer controller communicatively coupled to the media-processing assembly and the printer communication module, the printer controller configured to cause the media-processing assembly to process the print media in accordance with the print instructions, wherein: the barcode reader is configurable to alternatively operate in one of at least two modes; in a first mode of the at least two modes the barcode reader controller is configured to, responsive to successfully decoding an indicium in the image data, transmit, via the barcode reader communication module, a first message to the external device, the first message including a payload associated with the indicium and excluding a command that, if received by the printer, would cause the printer controller to cause the media-processing assembly to process the print media; and in a second mode of the at least two modes the barcode reader controller is configured to, responsive to successfully decoding the indicium in the image data, transmit, via the barcode reader communication module, a second message to the printer, the second message including the payload associated with the indicium and the command that causes the printer controller to cause the media-processing assembly to process the print media based at least in part on the payload associated with the indicium.

A barcode reader comprising: a barcode reader housing; an image-acquisition assembly positioned at least partially within the barcode reader housing and having a field of view (FOV), the image-acquisition assembly operable to capture image data associated with an environment appearing within FOV; a barcode reader communication module configured to transmit data to an external device; and a barcode reader controller communicatively coupled to the image-acquisition assembly and the communication module, the barcode reader controller configured to decode indicia appearing in the image data, wherein: the barcode reader is configurable to alternatively operate in one of at least two modes; in a first mode of the at least two modes the barcode reader controller is configured to, responsive to successfully decoding an indicium in the image data, transmit, via the barcode reader communication module, a first message to the external device, the first message including a payload associated with the indicium and excluding a command that, if received by a printer, would cause the printer to process a print media; and in a second mode of the at least two modes the barcode reader controller is configured to, responsive to successfully decoding the indicium in the image data, transmit, via the barcode reader communication module, a second message to the printer, the second message including the payload associated with the indicium and the command that would cause the printer to process the print media based at least in part on the payload associated with the indicium.

Suppress Error State Feedback (Beep, LED, Vibration) if No Data Sent to Host.

In an additional aspect, the present disclosure describes a barcode reader comprising: a housing; an image-acquisition assembly positioned at least partially within the housing and having a field of view (FOV), the image-acquisition assembly operable to capture image data associated with an environment appearing within FOV; a user-feedback assembly operable to provide a plurality of user-feedback responses; and a controller communicatively coupled to the image-acquisition assembly and to the user-feedback assembly, the controller configured to decode indicia appearing in the image data, wherein: the barcode reader is configurable to alternatively operate in one of at least two modes; in a first mode of the at least two modes the controller is configured to (i) instruct the user-feedback assembly to generate a first type of user-feedback response responsive to successfully decoding a first type of indicia, and (ii) instruct the user-feedback assembly to generate the first type of user-feedback response responsive to successfully decoding a second type of indicia; in a second mode of the at least two modes the controller is configured to (i) instruct the user-feedback assembly to generate a second type of user-feedback response responsive to successfully decoding the first type of indicia and (ii) not generate a user-feedback response responsive to successfully decoding the second type of indicia; the first type of indicia is different from the second type of indicia; the second type of user-feedback response is one of different from or same as the first type of user-feedback response responsive; and a parameter(s) for defining the first type of indicia and the second type of indicia being at least one of predefined within the controller or user-defined.

Apply ADF Based on Source (Com Protocol or Trigger).

In an additional aspect, the present disclosure describes a barcode reader comprising a barcode reader housing; an image-acquisition assembly positioned at least partially within the barcode reader housing and having a field of view (FOV), the image-acquisition assembly operable to capture image data associated with an environment appearing within FOV; a communication module configured to interface with an external host via at least two communication protocols; a memory storing a plurality of scripts, each of the plurality of scripts defining a configuration set that defines at least one operating parameter of the barcode reader; and a controller communicatively coupled to the image-acquisition assembly, the memory, and the communication module, the controller configured to decode indicia appearing in the image data, wherein: when the communication module is interfaced with the external host, the controller is operable to determine which of the least two communication protocols is utilized between the barcode reader and the external host; responsive to a first of the two communication protocols being utilized between the barcode reader and the external host, the controller executes a first script of the plurality of scripts to configure the barcode reader pursuant a first operating parameter(s); responsive to a second of the two communication protocols being utilized between the barcode reader and the external host, the controller executes a second script of the plurality of scripts to configure the barcode reader pursuant a second operating parameter(s); and the first script is different from the second script.

A barcode reader comprising: a barcode reader housing; an image-acquisition assembly positioned at least partially within the barcode reader housing and having a field of view (FOV), the image-acquisition assembly operable to capture image data associated with an environment appearing within FOV; a communication module configured to interface with an external host; a memory storing a plurality of scripts, each of the plurality of scripts defining a configuration set that defines at least one operating parameter of the barcode reader; and a controller communicatively coupled to the image-acquisition assembly, the memory, and the communication module, the controller configured to decode indicia appearing in the image data, wherein: the barcode reader is operable in one of at least two trigger modes; the controller is operable to determine which of the least two trigger modes is activated; responsive to a first of the at least two trigger modes being activated, the controller executes a first script of the plurality of scripts to configure the barcode reader pursuant a first operating parameter(s); responsive to a second of the at least two trigger modes being activated, the controller executes a second script of the plurality of scripts to configure the barcode reader pursuant a second operating parameter(s); and the first script is different from the second script.

Filter Output.

In an additional aspect, the present disclosure describes a barcode reader comprising: a housing; an image-acquisition assembly positioned at least partially within the housing and having a field of view (FOV), the image-acquisition assembly operable to capture image data associated with an environment appearing within FOV; a communication module configured to interface with an external host; a controller communicatively coupled to the image-acquisition assembly and to the communication module, the controller configured to decode indicia appearing in the image data, wherein: the barcode reader is configurable to alternatively operate in one of at least two modes; in a first mode of the at least two modes the controller is configured to, responsive to successfully decoding an indicium, cause the communication module to transmit a first message to the external host, the first message including an unaltered payload encoded by the indicia; and in a second mode of the at least two modes the controller is configured to, responsive to successfully decoding the indicium, cause the communication module to transmit a second message to the external host, the second message including an altered payload encoded by the indicia, the altered message excluding at least one character that is at least one of not recognizable or not acceptable by the external host.

Replace Data with User Defined Character(s).

In an additional aspect, the present disclosure describes a barcode reader comprising: a housing; an image-acquisition assembly positioned at least partially within the housing and having a field of view (FOV), the image-acquisition assembly operable to capture image data associated with an environment appearing within FOV; a communication module configured to interface with an external host; a controller communicatively coupled to the image-acquisition assembly and to the communication module, the controller configured to decode indicia appearing in the image data, wherein: the barcode reader is configurable to alternatively operate in one of at least two modes; in a first mode of the at least two modes the controller is configured to, responsive to successfully decoding an indicium, cause the communication module to transmit a first message to the external host, the first message including an unaltered payload encoded by the indicia; and in a second mode of the at least two modes the controller is configured to, responsive to successfully decoding the indicium, cause the communication module to transmit a second message to the external host, the second message including an altered payload encoded by the indicia, the altered message replacing at least one non-printable character contained within the payload with a respective printable character.

Replace a Specified Character in Barcode Data with a Key Sequence on the Host.

In an additional aspect, the present disclosure describes a barcode reader comprising: housing; an image-acquisition assembly positioned at least partially within the housing and having a field of view (FOV), the image-acquisition assembly operable to capture image data associated with an environment appearing within FOV; a communication module configured to interface with an external host; a controller communicatively coupled to the image-acquisition assembly and to the communication module, the controller configured to decode indicia appearing in the image data, wherein: the barcode reader is configurable to alternatively operate in one of at least two modes; in a first mode of the at least two modes the controller is configured to, responsive to successfully decoding an indicium, cause the communication module to transmit a first message to the external host, the first message including an unaltered payload encoded by the indicia; and in a second mode of the at least two modes the controller is configured to, responsive to successfully decoding the indicium, cause the communication module to transmit a second message to the external host, the second message including an altered payload encoded by the indicia, the altered message replacing at least one non-printable character contained within the payload with a respective key sequence.

Ability to Parse Out Data Relative to the End of the Barcode.

In an additional aspect, the present disclosure describes a barcode reader comprising: a housing; an image-acquisition assembly positioned at least partially within the housing and having a field of view (FOV), the image-acquisition assembly operable to capture image data associated with an environment appearing within FOV; a communication module configured to interface with an external host; a controller communicatively coupled to the image-acquisition assembly and to the communication module, the controller configured to decode indicia appearing in the image data, wherein: the barcode reader is configurable to alternatively operate in one of at least two modes; in a first mode of the at least two modes the controller is configured to, responsive to successfully decoding an indicium, cause the communication module to transmit a first message to the external host, the first message including an unaltered payload encoded by the indicia; and in a second mode of the at least two modes the controller is configured to, responsive to successfully decoding the indicium, cause the communication module to transmit a second message to the external host, the second message including an altered payload encoded by the indicia, the altered message excluding a predefined number of characters, the predefined number of characters appearing at least one of at a beginning of a string or at an end of the string that forms the payload.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate aspects of concepts that include the claimed invention, and explain various principles and advantages of those aspects.

FIG. 3 is a table representing an example audible sequence, in accordance with aspects described herein.

FIG. 6 is a table representing an example filter output data, in accordance with aspects described herein.

Figure 1:
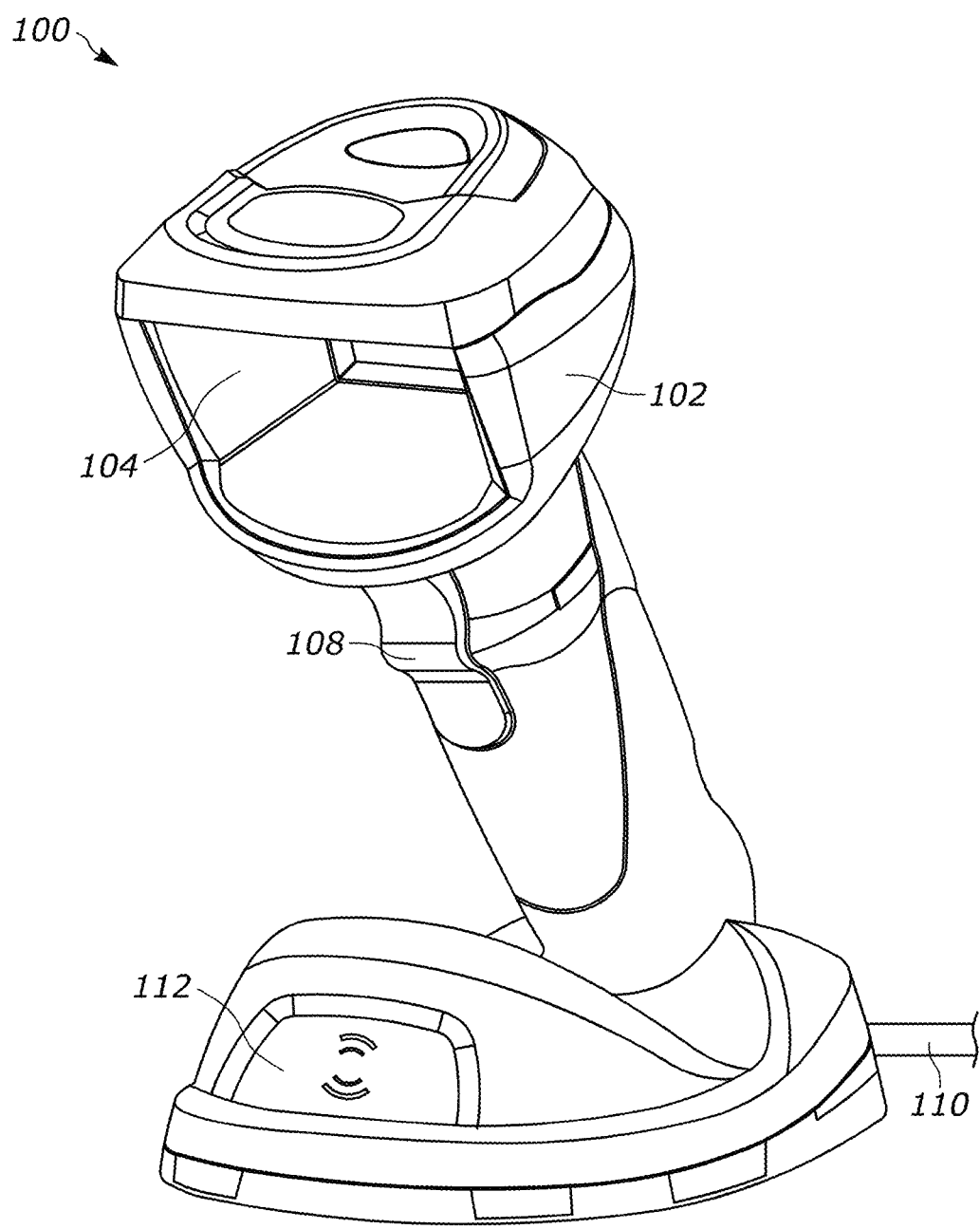
FIG. 1 illustrates a perspective view of an example barcode reader in accordance with various embodiments disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of aspects of the present invention.

The apparatus and method components have been represented where appropriate by conventional symbols in the drawings, showing only those specific details that are pertinent to understanding the aspects of the present invention so as not to obscure the disclosure with details that will be readily apparent to those of ordinary skill in the art having the benefit of the description herein.

DETAILED DESCRIPTION

The present disclosure refers to, in various aspects, an Advanced Data Formatting (ADF), which allows a user to easily program, update, or otherwise configured a scanner using a graphic user interface (GUI) or otherwise programmatic systems and methods. By way of non-limiting example 123SCAN software, as provided by ZEBRA TECHNOLOGIES CORPORATION, can include ADF programmatic utilities and/or related GUIs to allow scanner configuration as described herein. Generally, 123SCAN software is a MICROSOFT WINDOWS and/or LINUX based software program or utility that has one or more GUIs (e.g., one or more wizards or screens) that simplify configuration and deployment of a barcode reader. The 123SCAN software can automatically detect a barcode reader, or other data capture device, and can then launch a GUI to guide a user through a configuration process of the barcode reader. In addition, the 123SCAN software can update firmware, setup or stage large numbers of devices, display barcode data and images, and generate reports. It should be understood that 123SCAN software is but one example and that scanner configuration using advanced data formatting (ADF) can be implemented by software or computing instructions as part of an application (app) or program executing on a host computer or system for configuring a barcode reader, e.g., as described herein for FIGS. 1 and 2, or elsewhere herein. More generally, scanner configuration may also be implemented by scanning barcodes containing settings information. These barcodes can be from a printed manual or generated by a program executing on a host computer.

FIG. 1 illustrates a perspective view of an example barcode reader 100 in accordance with various embodiments disclosed herein. Barcode reader 100 may also be referred to herein as a "scanning device," "scanner device," or simply a "scanner." Further, the barcode reader may comprise, in various aspects, a barcode scanner, an RFID reader, and/or otherwise a data input device for scanning or reading scan data as described herein. Barcode reader 100 may include a housing or portion (e.g., a molded portion) that covers its various components. In various aspects, the housing may be ergonomic to confirm to a user's hand, e.g., may include a handle with a trigger.

Barcode reader 100 includes an image-acquisition assembly 102, with a scanning window 104. Image-acquisition assembly 102 may include an image sensor that may include a plurality of photo-sensitive elements. The photo-sensitive elements may be arranged in a pattern and may form a substantially flat surface. For example, the photo-sensitive elements may be arranged in a grid or a series of arrays forming a 2D surface. The image sensor of the image-acquisition assembly 102 may have an imaging axis that extends through scanning window 104 for the purpose of capturing or scanning scan data, e.g., such as 1D or 2D images which may comprise barcodes, QR codes, or the like.

The image-acquisition assembly 102 may have an effective reading range defined by the image sensor, e.g., where the effective reading range may correspond to the physical range of the laser or other optical wavelength projected by the image sensor. The image-acquisition assembly 102 may also have an optical field of view (FOV) defined by the image sensor and fitting the scanning window 104. For example, the optical FOV may be shaped by the effective reading range of the image sensor and be configured to extend through the opening defined by the scanning window 104. In certain embodiments, the imaging axis of the image sensor may be coaxial with the optical FOV, where each may extend through scanning window 104. The image-acquisition assembly 102 is operable to capture image data associated with an environment appearing within the FOV.

In example aspect of FIG. 1, barcode reader 100 also comprises an RFID reader 112. RFID reader 112 includes an RFID radio antenna configured to emit an RFID based radiation pattern (e.g., a radio frequency RF field of view). In certain modes, the RFID reader 112 may operate to automatically read RFID tags within the radiation pattern emitted by RFID reader 112. In some embodiments, the RFID reader may be an ultra-high frequency (UHF) RFID reader.

Barcode reader 100 further includes trigger 108. In some embodiments, trigger 108 may activate each of the image-acquisition assembly 102 and the RFID reader 112 together. In other embodiments, trigger 108 may be configured to activate, at least initially, one of the image-acquisition assembly 102 or the RFID reader 112 where, for example, a top portion of trigger 108 activates the image-acquisition assembly 102 and a bottom portion of trigger 108 activates the RFID reader 112, or vice versa. It is to be understood however, that activation of the image-acquisition assembly 102 and/or the RFID reader 112 need not occur solely through trigger 108, and that barcode reader 100 may also operate in a "hands-free" mode where activation of the image-acquisition assembly 102 and/or the RFID reader 112 may occur upon the detection of products in the vicinity, field of view, effective reading range, etc. of barcode reader 100.

In various aspects, activation of the image-acquisition assembly 102, e.g., via trigger 108, may cause the image-acquisition assembly 102 to capture scan data (e.g., image data or information). Such scan data or information may include, for example, product codes (e.g., barcodes or QR codes) associated with corresponding products. In other embodiments, the data or information may include signature information or data.

Similarly, activation of the RFID reader 112, e.g., via trigger 108, may cause the RFID reader 112 to capture tag data or other such information. Such tag data or other information may be encoded, for example, on one or more RFID tags associated with one or more corresponding products.

The data or information captured from either the image-acquisition assembly 102 and/or the RFID reader 112 may be transmitted to a host computer (e.g., such as a host personal computer (PC)), servers, or other processing devices (e.g., the system of FIG. 2) for a variety of purposes including, e.g., for implementing scanner configuration based on the focus of one or more host application screens. Barcode reader 100 includes a cabling interface 110 for transmission of such data or information, which may include an interface for connecting to an input/output (I/O) interface (e.g., I/O interface 208) a computer system. In various embodiments, barcode reader may support several data transmission interfaces including, for example, the USB standard, Keyboard Emulation, the BLUETOOTH standard, Standard RS-232, the IBM 468X/469X protocol, the SIMPLE SERIAL INTERFACE (SSI) protocol, or other similar data transmission interfaces and/or data transmission standards or protocols.

Figure 2:
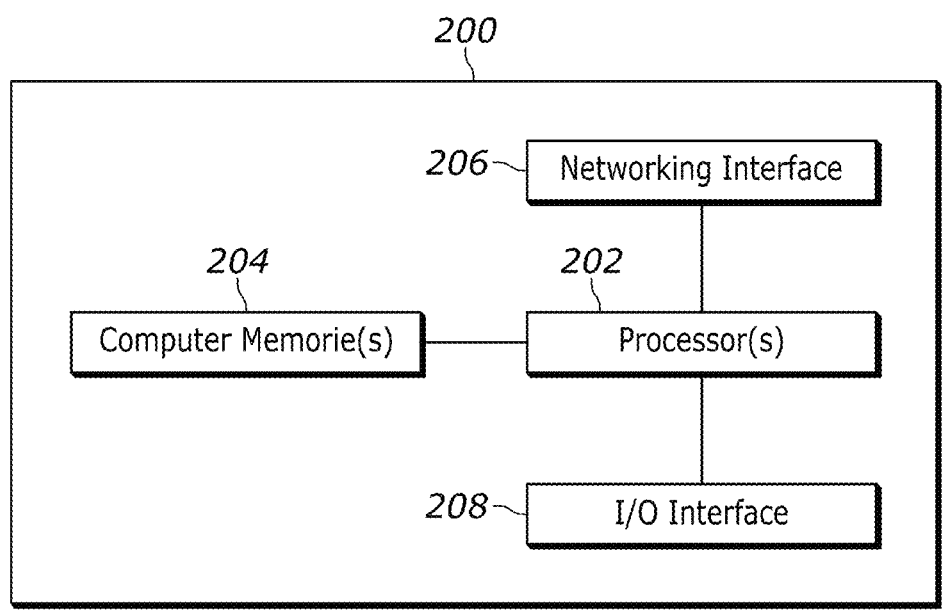
FIG. 2 is a block diagram representative of an example logic circuit capable of implementing one or more components of the example systems and methods for implementing scanner configuration using advanced data formatting, as described herein.

Barcode reader 100 may also include a processor (e.g., one processor of processor(s) 202 of FIG. 2) for implementing scanner configuration using advanced data formatting as described herein.

FIG. 2 is a block diagram representative of an example logic circuit capable of implementing one or more components of the example systems and methods for implementing scanner configuration using advanced data formatting, as described herein. The example logic circuit of FIG. 2 is a processing platform 200 (e.g., a host computer and/or barcode reader comprises one or more processors and one or more memories) capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs). Block diagram of FIG. 2 may comprise components configured inside of barcode reader 100. Additionally, or alternatively, barcode reader 100 may comprise components remote to barcode reader 100. For example, the block diagram of FIG. 2 may comprise an external host computer or host device that is remote or external to the barcode reader 100. Still further, the components of logic circuit of FIG. 2 may be connected to a printer (no shown). The printer may comprise a printer housing, a media-processing assembly configured to process print media in accordance with print instructions, a printer communication module configured to receive data from another external device, and a printer controller communicatively coupled to the media-processing assembly and the printer communication module. The printer controller may be configured to cause the media-processing assembly to process the print media in accordance with the print instructions.

The example processing platform 200 of FIG. 2 includes one or more processor(s) 202 such as, for example, one or more microprocessors, controllers, and/or any suitable type of processor. The example processing platform 200 of FIG. 2 includes one or more memories (e.g., volatile memory, non-volatile memory) 204 accessible by the one or more processor(s) 202 (e.g., via a memory controller). The example processor(s) or controller(s) 202 interact with the memorie(s) 204 to obtain, for example, machine-readable instructions stored in the memorie(s) 204 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 200 to provide access to the machine-readable instructions stored thereon.

The example processing platform 200 of FIG. 2 also includes a network interface 206 to enable communication with other machines via, for example, one or more networks. The example network interface 206 includes any suitable type of communication interface(s) (e.g., wired and/or wireless interfaces) configured to operate in accordance with any suitable protocol(s).

The example, processing platform 200 of FIG. 2 also includes input/output (I/O) interfaces 208 to enable receipt of user input and communication of output data to a barcode reader (e.g., barcode reader 100) and/or to a user via a user input/output interface (e.g., a keypad, keyboard, touchpad, button interface, display, or user feedback). The feedback may be feedback provided by barcode reader 100, where such feedback comprises an LED, audible feedback, and/or GUI feedback or otherwise feedback associated with barcode reader 100.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

Figure 8:
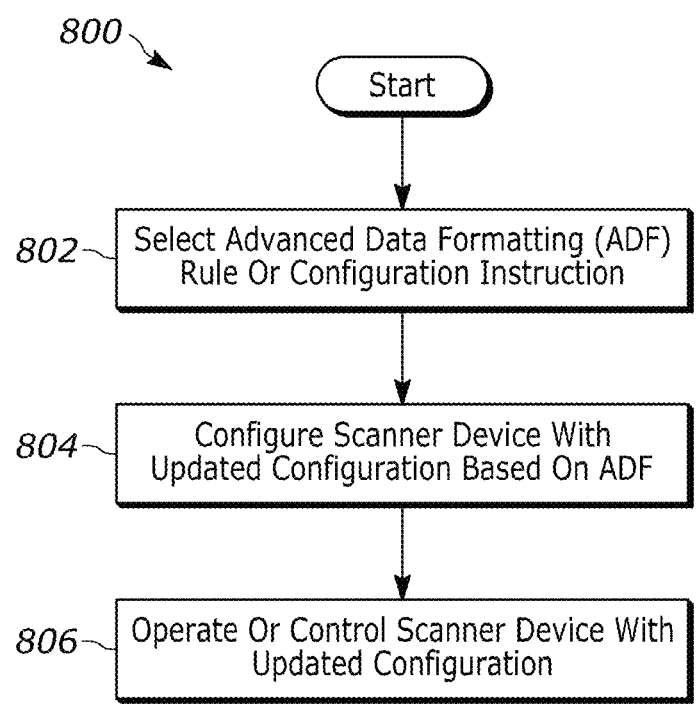
FIG. 8 illustrates an example method for implementing scanner configuration using advanced data formatting, as described herein.

Various example systems and methods for implementing scanner configuration using advanced data formatting are described herein below. For example, FIG. 8 illustrates an example method 800 for implementing scanner configuration using advanced data formatting (ADF), as described herein. At block 802, a user may select (e.g., from a GUI) an ADF rule or otherwise a configuration instruction, option, or feature. At block 804, a host application, e.g., executing on processor(s) 202, may configure a barcode reader (e.g., barcode reader 101) based on the ADF configuration as selected. Configuration may include updating the drivers and/or firmware of the barcode reader with an ADF rule or instruction, for example, to configure the barcode reader to perform one or more actions. In various aspects, a scanner can be programmed or configured by scanning one or more 1D barcodes, 2D barcode(s). Additionally, or alternatively, a barcode reader can be programmed via an electronic or networked connection, a cable connection, or via an enterprise update where a configuration is pushed out over a network to one or more scanners. A configuration may be based on programmed instructions or data stored in a computer memory of a given barcode reader (e.g., a computer memory of barcode reader 100).

At block 806, the scanner may then be operated or controlled based on the updated ADF configuration. For example, such configuration may include active data formatting for appending asset information to scanned data; assigning criteria to trigger buttons of a barcode reader (e.g., one button to another or vice versa); sending data from one position to another; and/or assigning an ADF rule per host (e.g., a first rule for IBMHH format and a second rule for an HID format). The ADF based systems and methods further include controlling LED, pager motor, or beepers. The ADF based systems and methods further include programming a printer in a single action (e.g., programming up to 30 strings in a single action or command).

The ADF based systems and methods provide improvements over existing scanner configuration technologies at least because the ADF based systems and methods disclosed herein provide reduced programming (e.g., reduced programming from 25 to 5 actions), which can improve the memory or processing needed for the barcode reader and/or related host system to program or configure the barcode reader. In addition, ADF based systems and methods provide GUI based configuration, e.g., the ability to drag and drop an ADF rule for the configuration of a physical barcode reader, in order to program or configure the barcode reader. More generally, Improvements over existing scanner configuration technologies include: increasing the capacity to process large blocks of input data with a single action when multiple actions were previously required; supporting new actions that eliminate the need for several individual actions to perform the same task; and, supporting larger search-and-replace strings, all of which may be performed with fewer actions required to perform the same activities. Additional examples are provided in the examples herein, including those below.

User Feedback Control.

In various aspects, a scanner system can be configured to implement scanner configuration regarding user feedback control. The scanner system can comprise a barcode reader (e.g., barcode reader 100 or other data capture device) and one or more processors (e.g., processor(s) 202), which can be one or more processors of the scanner and/or host computer to which the scanner is connected. In addition, the scanner system can comprise a memory (e.g., one or more memorie(s) 204) communicatively coupled to the one or more processors. The scanner may further comprise computing instructions stored on the memory that when executed by the one or more processors, cause the one or more processors to configure the barcode reader to provide a user feedback as an output of the barcode reader.

The user feedback can comprise one of more an audible feedback, a visual feedback, or a tactile feedback. For example, in one aspect, an audible feedback can comprise a beep indication as output by a speaker of a barcode reader (e.g., barcode reader 100). This is illustrated, for example, by FIG. 3.

FIG. 3 is a table 300 representing an example audible sequence, in accordance with aspects described herein. Table 300 illustrates output tones configurable by ADF rules. For example, table 300 indicates twenty seven (27) options which may be selected. In the example of FIG. 3, the scanner may be configured to emit sound as a beep indication or sequence. The options are configurable, e.g., in various pitch tones such as high pitch (e.g., for successful scan or read) or also low pitch (e.g., used to indicate an error or alert of a specific process required as a result of scanning a certain barcode).

For example option number 1 configures the barcode reader (e.g., barcode reader 100) to beep or emit sound one (1) time at high frequency for short duration. As a further example, option number 7 configures the barcode reader (e.g., barcode reader 100) to beep or emit sound two (2) times at low frequency for short duration. As a still further example, option number 21 configures the barcode reader (e.g., barcode reader 100) to beep or emit sound four (4) times at a high-low-high-low frequency for short duration. The other options are similar, but are configured as shown for FIG. 3.

In another example, the output of the barcode reader can comprise visual feedback such as an indication as output by a light-emitting-diode (LED) of a barcode reader (e.g., barcode reader 100). In various aspects, the barcode reader can be configured to illuminate the barcode reader's LED in a specified color and for the specified duration. For example, the visual feedback can be color coded (e.g., Green, Amber, Red, Blue, or the like). Additionally, or alternatively, the visual feedback can be changed or alternated, in one or more patterns of visual feedback. For example, the LED can be turned solid for one or more seconds (or a fraction of a second). Additionally, or alternately, an LED can be set to flashing for one or more seconds (or fractions of a second). Additionally, or alternatively, the duration of the pattern or sequence can be set to a minimum or maximum duration (e.g., 1 second to 10 seconds).

In a still further example, the output of the barcode reader can comprise a vibrate indication (e.g., a tactile indication). When configured with a vibrate indication, a barcode reader is enabled to vibrate on a successful barcode scan. The vibration can be performed via a vibrator or other electromechanical component that emits or creates a tactile force. The vibrate indication can include, for example, a duration of 250 milliseconds (ms) causing the barcode reader to vibrate for this period of time. Additionally, or alternatively, the barcode reader can be configured to vibrate in a given sequence, e.g., for specified number of repetitions. For example, the barcode reader may be configured to vibrate in the following manner for a triple vibration pattern: 250 ms vibrate, 250 ms pause, 250 ms vibrate, 250 ms pause, 250 ms vibrate, and 250 ms pause. It is to be understood that more, additional, and different vibrations could, or patterns, could be configured to order to provide a vibration based feedback from the barcode reader.

In still further aspects, user feedback may be provided to indicate one or more of: a positive scan result, a negative scan result, or a scan failure. In various aspects a positive or negative scan result can be based on the context of the user's interaction with the barcode reader. This may include how the system is triggered, what host is connected, or the content and order of the data collected by the device.

Still further, today in the industry, a scanner can read all barcode symbologies and provide the same programmed User Feedback (beeper, LED and vibration).

However, a scanner can now be programmed to provide different user feedback (beeper, LED and vibration) based on the context of the barcode (symbology, length, presence of unique string in the data).

For example, a scanner can now be programmed to beep, LED, vibrate one way when scanning a UPC and a different way when scanning a Code 128. So, to provide positive scan feedback, both Symbologies have different user feedback but the scanner can be programmed to always provide the same negative feedback. The feedback can be customized based on symbology, length of symbol, and presence of a unique string and that string's location.

Accordingly, in some aspects, a barcode reader is disclosed comprising: a housing; an image-acquisition assembly positioned at least partially within the housing and having a field of view (FOV), the image-acquisition assembly operable to capture image data associated with an environment appearing within FOV; a user-feedback assembly operable to provide a plurality of user-feedback responses; and a controller communicatively coupled to the image-acquisition assembly and to the user-feedback assembly, the controller configured to decode indicia appearing in the image data, wherein: the barcode reader is configurable to alternatively operate in one of at least two modes; in a first mode of the at least two modes the controller is configured to (i) instruct the user-feedback assembly to generate a first type of user-feedback response responsive to successfully decoding a first type of indicia, and (ii) instruct the user-feedback assembly to generate the first type of user-feedback response responsive to successfully decoding a second type of indicia; in a second mode of the at least two modes the controller is configured to (i) instruct the user-feedback assembly to generate a second type of user-feedback response responsive to successfully decoding the first type of indicia and (ii) instruct the user-feedback assembly to generate a third type of user-feedback response responsive to successfully decoding the second type of indicia; the first type of indicia is different from the second type of indicia; the second type of user-feedback response is different from the third type of user-feedback response; the second type of user-feedback response is one of different from or same as the first type of user-feedback response responsive; and a parameter(s) for defining the first type of indicia and the second type of indicia being at least one of predefined within the controller or user-defined.

In some aspects, the user-feedback response may comprise one or more of: an audible feedback, a visual feedback, or a tactile feedback.

In further aspects, the user-feedback response is dependent on the context of a scanned barcode, the context selected from at least one of: symbology, length, or presence of unique string in scan data.

In still further aspects, the indicia may comprise one or more of: a positive scan result, a negative scan result, or a scan failure.

Output Asset Tracking Information.

In various aspects, a scanner system can be configured to implement scanner configuration regarding changing the input source based on asset tracking information. The scanner system can comprise a barcode reader (e.g., barcode reader 100 or other data capture device) and one or more processors (e.g., processor(s) 202), which can be one or more processors of the scanner and/or host computer to which the scanner is connected. In addition, the scanner system can comprise a memory (e.g., one or more memorie(s) 204) communicatively coupled to the one or more processors. The scanner may further comprise computing instructions stored on the memory that when executed by the one or more processors, cause the one or more processors to update the barcode reader to read data in a format defined by asset tracking information. The computing instructions, when executed by the one or more processors, may also cause the one or more processors to configure to the barcode reader to output scan data corresponding to the asset tracking information.

In various aspects, the asset tracking information may comprise one or more fields selected from one or more of a model number, a serial number, a firmware version, and/or a configuration file name.

A barcode reader (e.g., barcode reader 100) can be configured to change the source of data an ADF rule is applied to. This can be an asset information portion of the input data as scanned by a scanner, e.g., the output scan data. Said another way, the ADF rule is applied or executed (e.g., by processor(s) of the barcode reader or host computer) to change the input data source from scanned barcode data to a selected one or more portion(s) of scanner asset tracking information. For example, asset tracking information such as asset information (e.g., individual fields and/or combinations of asset tracking information) may be added or applied to scanned data. The asset tracking information may be added as a prefix and/or suffix to the scanner data. Such asset tracking information may include one or more of a model number of the item or product scanned, a serial number of the item or product scanner, a firmware version of the item or product scanner, or a configuration file name.

In various aspects, selection of an ADF rule for setting up asset tracking information causes a cursor location pointer to start at the beginning (first character) of the asset tracking information. In this way, the scanner will be configured to read barcodes, or other information, with the expectation that the asset tracking information will be a part of the barcode (e.g., as a prefix and/or suffice). If the input source is switched back to scanned barcode data, the cursor location pointer is restored to its previous barcode data position. In various aspects, it is to be understood that a "cursor" or "scanner cursor" refers to a pointer to a next character of scanned input data to be processed by an ADF rule's related actions.

Still further, a work site may have several workstations where each station has a barcode scanner reading barcodes. The data is sent to a central computer system for processing. Today in the industry, there is no way to identify which scanner collected the data by configuring the scanner to output serial number. Also, no other asset information (model number, serial number, date of manufacture, firmware version, configuration file name) can be programmed to be output with a scan.

However, a barcode scanner can be configured to append any scanner asset information (model number, serial number, date of manufacture, firmware version, configuration file name) when transmitting barcode data to the host.

For example, several store clerks are scanning items on the shelves to take inventory. The serial number of the scanner assigned to each clerk is recorded in advance. As the data is scanned, the scanner's serial number is appended to the UPC barcode data being scanned by the clerk. This data is collected by a central station. At the end of the day the data reflects the items scanned by each scanner Accordingly, in some aspects, the present disclosure describes a barcode reader comprising: a housing; an image-acquisition assembly positioned at least partially within the housing and having a field of view (FOV), the image-acquisition assembly operable to capture image data associated with an environment appearing within FOV; a memory storing at least one barcode reader-specific parameter; a communication module configured to transmit data to an external device; a controller communicatively coupled to the image-acquisition assembly, the communication module, and the memory, the controller configured to decode indicia appearing in the image data, wherein: the barcode reader is configurable to alternatively operate in one of at least two modes; in a first mode of the at least two modes the controller is configured to, responsive to successfully decoding an indicium in the image data, transmit, via the communication module, a first message to the external device, the first message including at least a portion of a payload associated with the indicium and excluding the at least one barcode reader-specific parameter; and in a second mode of the at least two modes the controller is configured to, responsive to successfully decoding the indicium in the image data, transmit, via the communication module, a second message to the external device, the second message including the at least a portion of the payload associated with the indicium and the at least one barcode reader-specific parameter.

In some aspects, barcode reader-specific parameter may comprise one or more fields selected from one or more of: a model number, a serial number, a firmware version, or a configuration file name.

Change Input Source.

In various aspects, a scanner system can be configured to implement scanner configuration regarding changing an input source of a barcode reader. The scanner system can comprise a barcode reader (e.g., barcode reader 100 or other data capture device) and one or more processors (e.g., processor(s) 202), which can be one or more processors of the scanner and/or host computer to which the scanner is connected. In addition, the scanner system can comprise a memory (e.g., one or more memorie(s) 204) communicatively coupled to the one or more processors. The scanner may further comprise computing instructions stored on the memory that when executed by the one or more processors, cause the one or more processors to configure the barcode reader to aggregate output data from selected portions of one or more input sources.

In various aspects, the input sources may comprise one or more of: a user defined string, asset tracking information, a barcode (e.g., a barcode a previously scanned), current time (e.g., real-time clock (RTC) data), current date, and/or RFID data.

In one aspect, an input source may comprise a user defined string. For example, a barcode reader (e.g., barcode reader 100) may be configured to change the source of data an ADF rule is applied to or otherwise executed for. For this example, this can be the user defined string portion of the input data. Said another way, execution or otherwise the application of the ADF rule changes the input data source from scanned barcode data to the user defined string specified in this action. The ADF rule provides the ability to input a string that can be one single character or multiple characters (e.g., mixed multiple characters), which may include special non-printable characters. For example, one user defined string may comprise: "<GS>714<TAB>," where it is to be understood that that "<GS>" represents the ASCII group separator character 29 and "<TAB>" represents the ASCII horizontal tab character 9. Each of <GS> and <TAB> are examples of unprintable and/or recognizable characters.

In various aspects, selection of an ADF rule for defining a user defined string causes a cursor location pointer to start at the beginning (first character) of the user defined string. In this way, the scanner will be configured to read barcodes, or other information, with the expectation that the user defined string will be a part of the barcode (e.g., as a prefix and/or suffix). If the input source is switched back to scanned barcode data, the cursor location pointer is restored to its previous barcode data position.

In some aspects, a user can select or define the string length of a barcode or other information to be scanned. For example, if the selected ADF String Length is set to "Full," then a string with a maximum length (e.g., 128 characters) can be specified. Otherwise a lesser value, e.g., of compact character length, can be selected with fewer characters (e.g., maximum length is 30 characters). More generally, in some aspects, a user can select a full ADF rule syntax that allows for processing larger blocks of data and longer search and replace strings. A user can also select a compact ADF rule syntax that processes smaller blocks of data and shorter search and replace strings. This allows the rules to potentially use less memory, and frees up space for more rules in the same space.

In another aspect, an input source may comprise asset tracking information. A barcode reader (e.g., barcode reader 100) can be configured to change the source of data an ADF rule is applied to or otherwise executed for. More generally, in some aspects, no matter the input source, any one or more of an ADF rule's editing capabilities are available to process data (i.e., and may be used for more than inserting data). For example, an ADF rule can be configured to include only the first 6 characters of a model number. This can be an asset information portion of the input source as scanned by a scanner. Said another way, the ADF rule is applied or executed to change the input data source from scanned barcode data to a selected one or more portion(s) of scanner asset tracking information. For example, asset tracking information such as asset information (e.g., individual fields and/or combinations of asset tracking information) may be added or applied to scanned data. The asset tracking information may be added as a prefix and/or suffix to the scanner data. Such asset tracking information may include one or more of a model number of the item or product scanned, a serial number of the item or product scanner, a firmware version of the item or product scanner, or a configuration file name.

In various aspects, selection of an ADF rule for setting up asset tracking information causes a cursor location pointer to start at the beginning (first character) of the asset tracking information. In this way, the scanner will be configured to read barcodes, or other information, with the expectation that the asset tracking information will be, or will become, a part of the barcode (e.g., as a prefix and/or suffix). If the input source is switched back to scanned barcode data, the cursor location pointer is restored to its previous barcode data position.

In a further aspect, an input source may comprise barcode data. A barcode data source is the default source for a barcode reader (e.g., barcode reader 100). A barcode reader (e.g., barcode reader 100) can be configured to change the source of data an ADF rule is applied to or is executed for, which can be barcode data or a barcode data portion as input data following a scan by the barcode reader. As an additional example, a flatbed scanner may have an attached auxiliary handheld scanner, and an ADF rule can be programmed or otherwise configured to apply only to data from this scanner. If no ADF rule or no input source is specified, then barcode data is configured as the default rule.

Still further, scanners can program a printer using upwards of 20 ADF actions to send printer programming language commands to a printer. The ADF actions define the details of a label to be printed based upon scanned barcode data.

However, in a single ADF action, a barcode scanner can transmit to a printer all programming language commands require to print a label in the required dimensions and fonts.

For example, a single ADF action can be programmed to a scanner to send the required commands to setup a printer to output a desired label. The ADF action enables a scanner to output scanned barcode data+the printer commands to output from a printer label showing the scanned barcode data.

Accordingly, in some aspects, a system is disclosed comprising: a barcode reader including: a barcode reader housing; an image-acquisition assembly positioned at least partially within the barcode reader housing and having a field of view (FOV), the image-acquisition assembly operable to capture image data associated with an environment appearing within FOV; a barcode reader communication module configured to transmit data to an external device; and a barcode reader controller communicatively coupled to the image-acquisition assembly and the communication module, the barcode reader controller configured to decode indicia appearing in the image data; and a printer including: a printer housing; a media-processing assembly configured to process print media in accordance with print instructions; a printer communication module configured to receive data from another external device; and a printer controller communicatively coupled to the media-processing assembly and the printer communication module, the printer controller configured to cause the media-processing assembly to process the print media in accordance with the print instructions, wherein: the barcode reader is configurable to alternatively operate in one of at least two modes; in a first mode of the at least two modes the barcode reader controller is configured to, responsive to successfully decoding an indicium in the image data, transmit, via the barcode reader communication module, a first message to the external device, the first message including a payload associated with the indicium and excluding a command that, if received by the printer, would cause the printer controller to cause the media-processing assembly to process the print media; and in a second mode of the at least two modes the barcode reader controller is configured to, responsive to successfully decoding the indicium in the image data, transmit, via the barcode reader communication module, a second message to the printer, the second message including the payload associated with the indicium and the command that causes the printer controller to cause the media-processing assembly to process the print media based at least in part on the payload associated with the indicium.

In addition aspects, a barcode reader is disclosed comprising: a barcode reader housing; an image-acquisition assembly positioned at least partially within the barcode reader housing and having a field of view (FOV), the image-acquisition assembly operable to capture image data associated with an environment appearing within FOV; a barcode reader communication module configured to transmit data to an external device; and a barcode reader controller communicatively coupled to the image-acquisition assembly and the communication module, the barcode reader controller configured to decode indicia appearing in the image data, wherein: the barcode reader is configurable to alternatively operate in one of at least two modes; in a first mode of the at least two modes the barcode reader controller is configured to, responsive to successfully decoding an indicium in the image data, transmit, via the barcode reader communication module, a first message to the external device, the first message including a payload associated with the indicium and excluding a command that, if received by a printer, would cause the printer to process a print media; and in a second mode of the at least two modes the barcode reader controller is configured to, responsive to successfully decoding the indicium in the image data, transmit, via the barcode reader communication module, a second message to the printer, the second message including the payload associated with the indicium and the command that would cause the printer to process the print media based at least in part on the payload associated with the indicium.

In such aspects, the payload may be one of: a user defined string, asset tracking information, a barcode, current time, current date, or RFID data.

Suppress Error State Feedback (Beep, LED, Vibration) if No Data Sent to Host.

In various aspects, a scanner system can be configured to implement scanner configuration regarding suppressing errors or error state feedback, e.g., if no data is sent to a host computer. The scanner system can comprise a barcode reader (e.g., barcode reader 100 or other data capture device) and one or more processors (e.g., processor(s) 202), which can be one or more processors of the scanner and/or host computer to which the scanner is connected. In addition the scanner system can comprise a memory (e.g., one or more memorie(s) 204) communicatively coupled to the one or more processors. The scanner may further comprise computing instructions stored on the memory that when executed by the one or more processors, cause the one or more processors to configure the barcode reader to suppress an error state of the barcode reader when no scan data is transmitted to a host device from the barcode reader.

In such aspects, suppression of an error state may comprise preventing one or more outputs by the barcode reader (e.g., preventing the barcode reader to produce outputs). Such outputs may comprise audible feedback (e.g., a beep indication), visual feedback (e.g., LED output or GUI output), or tactile feedback (e.g., vibration feedback). In various aspects, if implementation of an ADF rule (e.g., the scanner scanning a barcode) results in no data being transmitted, an error indication may be suppressed (prevented) from being sent the barcode reader and/or host computer(s).

The firmware of a barcode reader can be updated to suppress output of a barcode reader. Additionally, or alternatively, host drivers of a host computer may be updated to suppress output of a barcode reader.

Still further, once a trigger is pulled on a scanner a beep is emitted indicating a decode occurred, then ADF is performed. So the ADF engine has no way of suppressing the already emitted positive feedback beep if no data is sent to the host.

However, ADF 2.0 enables a scanner to control what type of feedback is provided based on if the data is sent to the host. So when the trigger is pulled, no feedback (beep, LED, vibration) is provided until the ADF engine decides if data will be sent to the host or not.

For example, now a customer can program the scanner to only send positive feedback if data is sent to the host not when the scanner decodes the barcode. For example, data sent to host indicates a good decode beep and green LED and positive vibration. As another example, data not sent to host can equal no decode beep, no LED, no vibration, etc.

Accordingly, in some aspects, a barcode reader is disclosed comprising: a housing; an image-acquisition assembly positioned at least partially within the housing and having a field of view (FOV), the image-acquisition assembly operable to capture image data associated with an environment appearing within FOV; a user-feedback assembly operable to provide a plurality of user-feedback responses; and a controller communicatively coupled to the image-acquisition assembly and to the user-feedback assembly, the controller configured to decode indicia appearing in the image data, wherein: the barcode reader is configurable to alternatively operate in one of at least two modes; in a first mode of the at least two modes the controller is configured to (i) instruct the user-feedback assembly to generate a first type of user-feedback response responsive to successfully decoding a first type of indicia, and (ii) instruct the user-feedback assembly to generate the first type of user-feedback response responsive to successfully decoding a second type of indicia; in a second mode of the at least two modes the controller is configured to (i) instruct the user-feedback assembly to generate a second type of user-feedback response responsive to successfully decoding the first type of indicia and (ii) not generate a user-feedback response responsive to successfully decoding the second type of indicia; the first type of indicia is different from the second type of indicia; the second type of user-feedback response is one of different from or same as the first type of user-feedback response responsive; and a parameter(s) for defining the first type of indicia and the second type of indicia being at least one of predefined within the controller or user-defined.

In such aspects, the non-generation of the user-feedback may comprise suppression of an error state, and wherein suppression of the error states comprises preventing one or more outputs by the barcode reader: audible feedback, visual feedback, or tactile feedback.

In further aspects, suppression of the error state may comprise preventing user interface or alert feedback.

In further aspects, suppression of the error state may comprise preventing data from being transmitted to an external host.

Apply ADF Based on Source (COM Protocol or Trigger)

In various aspects, a scanner system can be configured to implement scanner configuration regarding applying an ADF rule based on source. The scanner system can comprise a barcode reader (e.g., barcode reader 100 or other data capture device) and one or more processors (e.g., processor(s) 202), which can be one or more processors of the scanner and/or host computer to which the scanner is connected. In addition the scanner system can comprise a memory (e.g., one or more memorie(s) 204) communicatively coupled to the one or more processors. The scanner may further comprise computing instructions stored on the memory that when executed by the one or more processors, cause the one or more processors to configure the barcode reader to format scan data based on a scan source type.

In such aspects, a scan source type can be selected from one or more of a host criteria or a trigger source criteria. In some aspects, such criteria updates can provide the ability to support multiple criteria within a single ADF rule. For example, a barcode reader (e.g., barcode reader 100) may be configured to format scan data based on the type of host device (e.g., type of computer, mobile device, or external device) that will receive the output data from the scanner. Additionally, or alternatively, a host device or host based computer configuration provides the ability to assign criteria (e.g., com protocol used) based a host type using an ADF rule. For example, a first criteria may be for an IBM HID enabled handheld device. As another example, a second criteria may be for a SNAPI based device.

Figure 4:
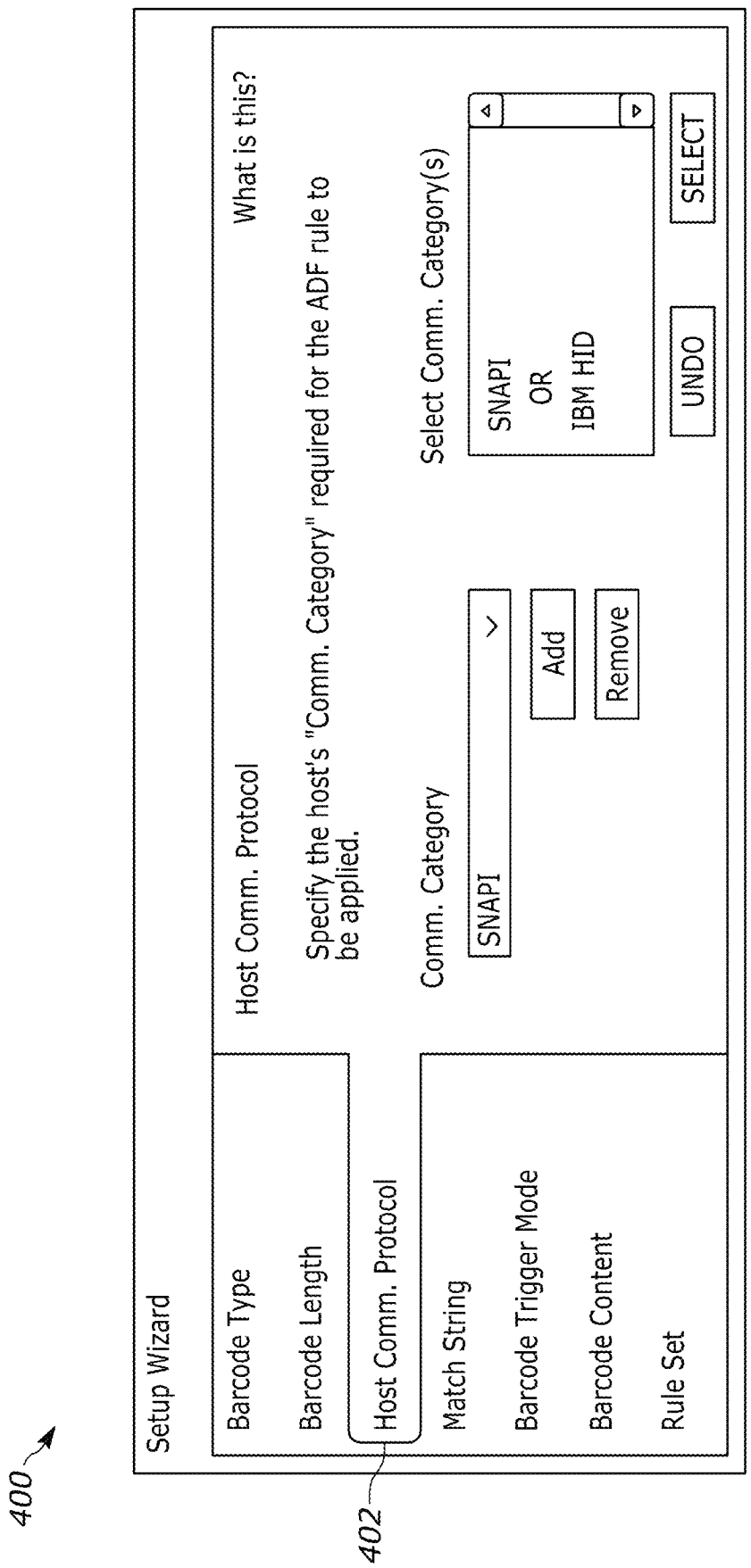
FIG. 4 illustrates an example configuration graphical user interface (GUI) for scanner configuration using advanced data formatting, in accordance with aspects described herein.

FIG. 4 illustrates an example configuration graphical user interface (GUI) 400 for scanner configuration using advanced data formatting, in accordance with aspects described herein. In the example of FIG. 4, GUI 400 comprises an option to select a host communication protocol. As shown for FIG. 4, an ADF rule for the host computer (e.g., a host computer as shown for FIG. 2) is setup for configuring a barcode reader and/or host computer itself. This includes the SNAPI and the IBM HID host communication protocols, where the ADF rule configures the barcode reader (e.g., barcode reader 100) and/or host computer to transmit and/or receive data in the SNAPI and/or IBM HID data formats and/or communication protocols. A user may choose to select this option from GUI 400, which causes the barcode reader and/or host computer to be updated or configured with the selected communication protocols.

Figure 5:
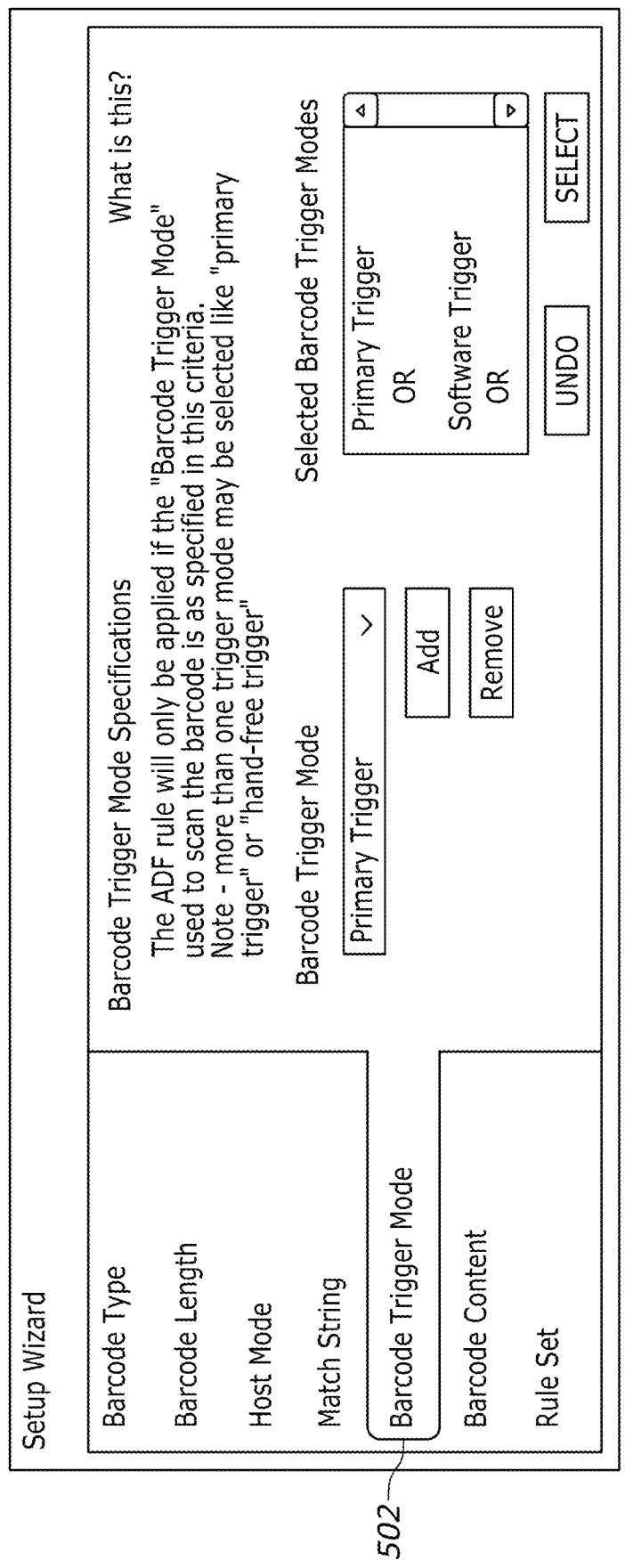
FIG. 5 illustrates a further example configuration graphical user interface (GUI) for scanner configuration using advanced data formatting, in accordance with aspects described herein.

Additionally, or alternatively, a barcode reader may be configured to format scan data based on how the reading of barcode data is triggered. For example, FIG. 5 illustrates a further example configuration graphical user interface (GUI) 500 for scanner configuration using advanced data formatting, in accordance with aspects described herein. In the example of FIG. 5, GUI 500 comprises an option to select a barcode trigger mode. As shown for FIG. 5, an ADF rule for the host computer (e.g., a host computer as shown for FIG. 2) is setup for configuring a barcode reader. This includes a primary trigger and software trigger, where the ADF rule configures the barcode reader (e.g., barcode reader 100) to scan data when a trigger on the barcode reader is activated and/or when a software trigger (hands-free trigger) of the barcode reader is activated (e.g., such as via an RFID tag). A user may choose to select this option from GUI 500, which causes the barcode reader and/or host computer to be updated or configured with the selected trigger criteria. Triggers that may be selected, assigned, or otherwise configured to include a primary trigger mode, secondary button, hands-free decode, and/or software triggered decode (i.e., when a software trigger decode is sent from a host app, the scanning session is initiated without a button press).

Still further, additionally, or alternatively, a scan source type may be defined as a defined character set. In such aspects, a barcode reader (e.g., barcode reader 100) may be configured to format scan data based on the presence of certain character sets in the data. An example character set may comprise any one or more of: only numeric characters, only alphabetic, whitespace, and/or a predefined set of characters defined by user and stored in non-volatile memory. In various aspects, execution of an ADF rule can be limited to input data that contains only data from one or more character sets. For example, if numeric characters is selected, only barcodes containing just characters 0 to 9 would apply.

The scanner may be configured based on criteria by updating or configuring the firmware of a barcode reader and/or host device. This may include assigning one or more rule sets to a host computer based on different data types or formats types (e.g., com protocols). For example, a first rule set may be provided for an IBM handheld device or scanner. A second rule set may be provided for an HID based device or software program that sends and receives data in the HID data format.

Additionally, or alternatively, the firmware of a barcode reader and/or host device may be updated based on the screen or display of a host device that is currently focused. For example, use of a first screen or display may cause a command to be send to enable a first rule set. Then when a second (different) screen or display is accessed, another command may be sent to enable a second (different) rule set. Sending of either the first or second rule set causes the barcode reader and/or host computer to be updated or configured based on the app screen or display being used (and data formats transmitted to and/or from such screens to be used).

Still further, a store may use a number of the same model of barcode scanners at various locations in the business. The scanners used by the front end cashiers may need to be configured differently than the ones used by the mail room.

However, a barcode scanner that can be configured with a script to apply different scripts to barcode data depending on the protocol required to communicate with the host system. This allows a single model of barcode scanner to run the scripts intended for the place of usage automatically.

For example, the cashier stations at a store uses an IBM Retail interface over USB, whereas the mail room uses an USB HID Keyboard interface to connect the scanner. When a scanner is connected to the IBM retail interface, it can have scripts preprogrammed to edit barcode data to support retail transactions. If the same scanner is moved to the mailroom and connected there via USB HID Keyboard, the scanner can select a different set of scripts to process shipping information.

Accordingly, in some aspects, a barcode reader may comprise a barcode reader housing; an image-acquisition assembly positioned at least partially within the barcode reader housing and having a field of view (FOV), the image-acquisition assembly operable to capture image data associated with an environment appearing within FOV; a communication module configured to interface with an external host via at least two communication protocols; a memory storing a plurality of scripts, each of the plurality of scripts defining a configuration set that defines at least one operating parameter of the barcode reader; and a controller communicatively coupled to the image-acquisition assembly, the memory, and the communication module, the controller configured to decode indicia appearing in the image data, wherein: when the communication module is interfaced with the external host, the controller is operable to determine which of the least two communication protocols is utilized between the barcode reader and the external host; responsive to a first of the two communication protocols being utilized between the barcode reader and the external host, the controller executes a first script of the plurality of scripts to configure the barcode reader pursuant a first operating parameter(s); responsive to a second of the two communication protocols being utilized between the barcode reader and the external host, the controller executes a second script of the plurality of scripts to configure the barcode reader pursuant a second operating parameter(s); and the first script is different from the second script.

Still further, a medical office has a wireless barcode scanner that resides in a cradle, the scanner can automatically detect the presence of a barcode and scan it without touching the scanner. The scanner can be removed and used remotely scanning barcodes by pulling a trigger. No matter the triggering method, the scanner will send the same data no matter how the barcode scanning is initiated.

However, a barcode scanner can be configured via with scripts to perform different actions, depending on the method used to trigger the scanning of a barcode. For example, these can include: trigger option 1—button (only trigger on most scanners); trigger option 2—2nd button on device like cs6080; trigger option 3—hands free scanning; trigger option 4—in cradle scanning (this is hands free as well); trigger option 5—triggered by command sent by another processing means (host system).

For example, a healthcare office worker in a hospital will scan a barcode on their badge in handsfree mode to identify themselves. Then they will remove the scanner from the cradle. The scanner has some scripts programmed to process the prescription bottles used while walking with the scanner from patient to patient. The barcode scanner will only read barcodes on the patient's wrist band and on prescription trays while triggered by hand. Other barcodes are ignored. When the scanner is returned to the cradle it is programmed to only read badge ID barcodes presented to it Accordingly, a barcode reader is disclosed comprising: a barcode reader housing; an image-acquisition assembly positioned at least partially within the barcode reader housing and having a field of view (FOV), the image-acquisition assembly operable to capture image data associated with an environment appearing within FOV; a communication module configured to interface with an external host; a memory storing a plurality of scripts, each of the plurality of scripts defining a configuration set that defines at least one operating parameter of the barcode reader; and a controller communicatively coupled to the image-acquisition assembly, the memory, and the communication module, the controller configured to decode indicia appearing in the image data, wherein: the barcode reader is operable in one of at least two trigger modes; the controller is operable to determine which of the least two trigger modes is activated; responsive to a first of the at least two trigger modes being activated, the controller executes a first script of the plurality of scripts to configure the barcode reader pursuant a first operating parameter(s); responsive to a second of the at least two trigger modes being activated, the controller executes a second script of the plurality of scripts to configure the barcode reader pursuant a second operating parameter(s); and the first script is different from the second script.

Filter Output.

In various aspects, a scanner system can be configured to implement scanner configuration regarding modifying and/or filtering data output. The scanner system can comprise a barcode reader (e.g., barcode reader 100 or other data capture device) and one or more processors (e.g., processor(s) 202), which can be one or more processors of the scanner and/or host computer to which the scanner is connected. In addition the scanner system can comprise a memory (e.g., one or more memorie(s) 204) communicatively coupled to the one or more processors. The scanner may further comprise computing instructions stored on the memory that when executed by the one or more processors, cause the one or more processors to configure the barcode reader to filter data from being transferred to a host device, wherein the data as filtered is of an output type of the barcode reader.

For example, in various aspects, the output type may be selected from one or more of: non-printable data, whitespace data, numeric data, character data, or custom data. In various aspects, a barcode reader may be configured to filter input data based on the presence of certain character sets in the data. In such aspects, only specified types of character sets (i.e., non-filtered character sets) are allowed to be in the output data that is transmitted to a host device (e.g., a host computer as shown for FIG. 2).

FIG. 6 is a table 600 representing an example filter output data, in accordance with aspects described herein. Non-printable data may be non-printable ASCII value characters or data. White space can include tabs, spaces, line feeds, vertical tabs, carriage returns, or the like. Numeric values may comprise number values from 0 to 9. Character or alphas data may be, for example, Alphabetic data (A-Z) as formatted in ASCII, UTF-8, Unicode, or the like. Other or special characters or values may be values greater than ASCII values of 127 or other special characters (e.g., those other than alphanumeric values). Custom data may be, for example, predefined set of characters defined by user and stored in non-volatile memory.

A barcode reader and/or host computer may be configured to exclude or filter transmission of data from the barcode reader to the host computer. This may be configured at either the barcode reader or the host computer (or both).

Figure 7A:
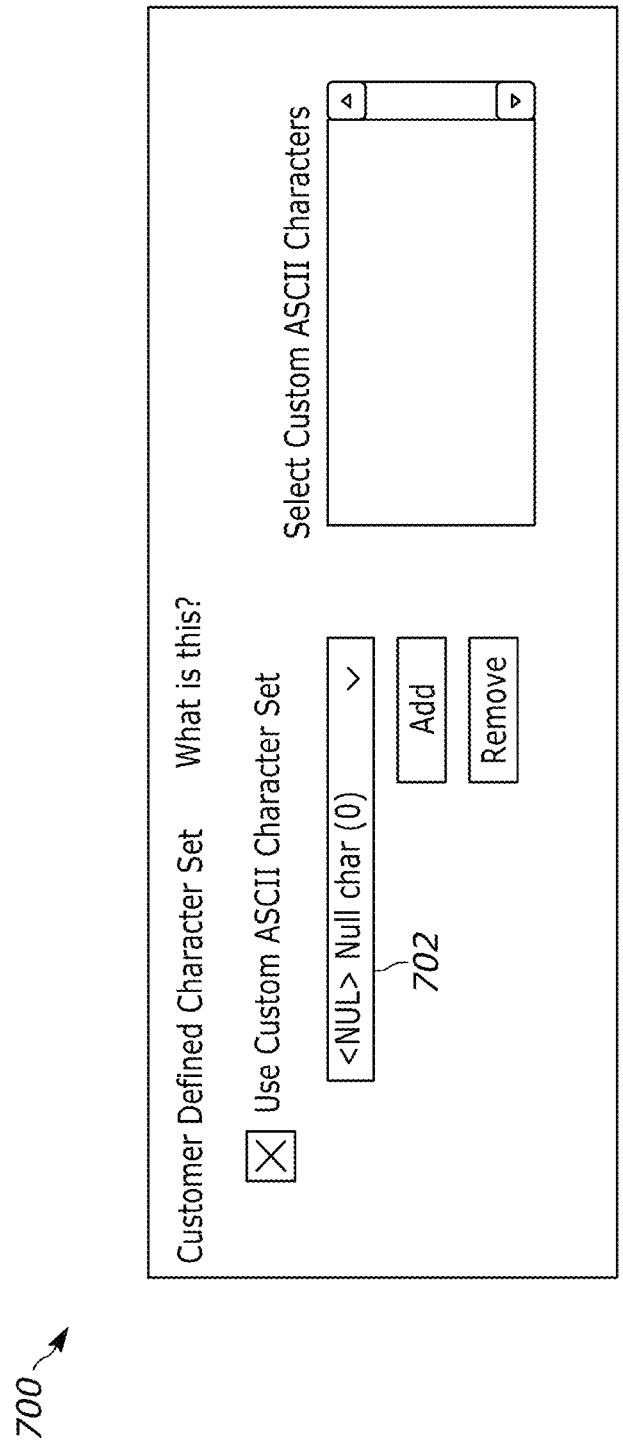
FIG. 7A illustrates a further example configuration graphical user interface (GUI) for scanner configuration using advanced data formatting, in accordance with aspects described herein.

For example, FIG. 7A illustrates a further example configuration graphical user interface (GUI) 700 for scanner configuration using advanced data formatting, in accordance with aspects described herein. In the example of FIG. 7A, a user may add information to generate or create an ADF rule based on criteria including alpha or number criteria. For example, the ADF rule may be a custom filter to exclude certain alpha, numeric, non-printable, whitespace, or other data as described herein.

Figure 7B:
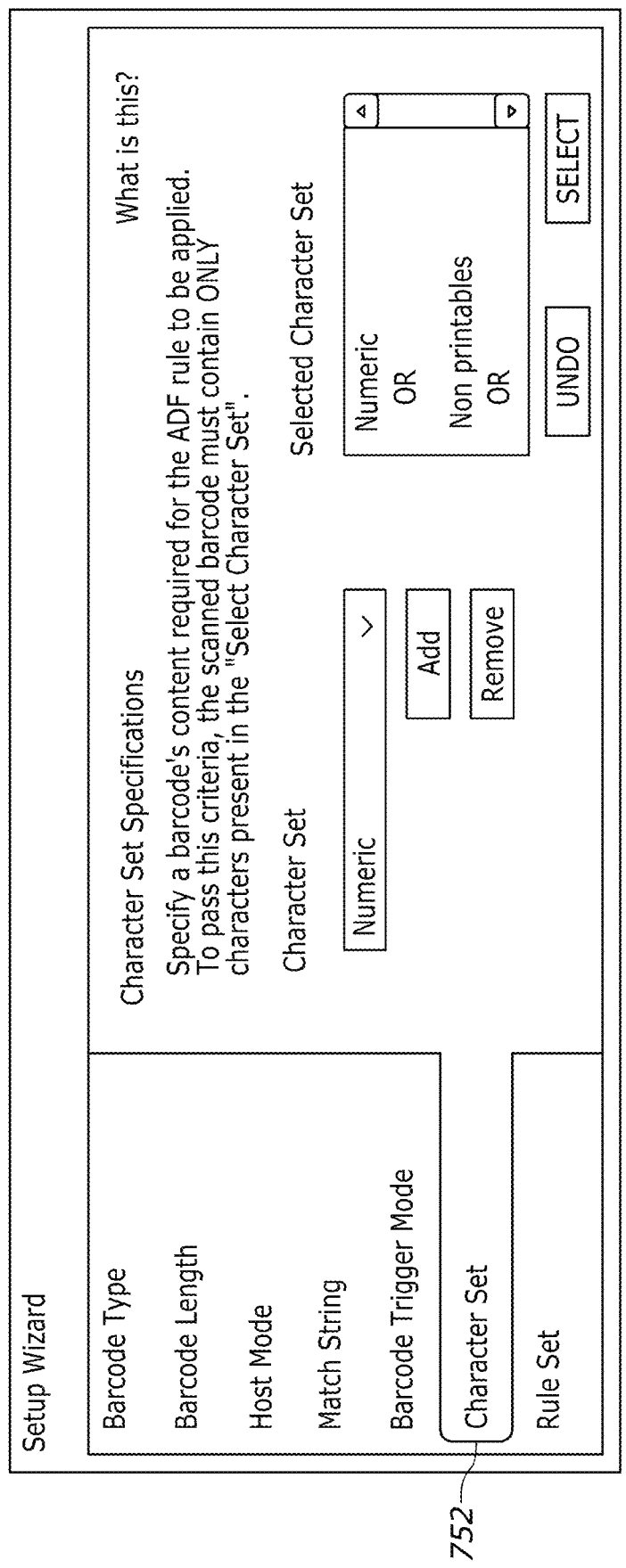
FIG. 7B illustrates a further example configuration graphical user interface (GUI) for scanner configuration using advanced data formatting, in accordance with aspects described herein.

FIG. 7B illustrates a further example configuration graphical user interface (GUI) 750 for scanner configuration using advanced data formatting, in accordance with aspects described herein. In the example of FIG. 7B, barcode information or otherwise transferred data may be filtered or modified based upon a data type or character set, such as number and/or non-printable data.

Filtering data excludes (removes) the selected data category(s) from being transmitted to the host. For example, if the input data is "123abc," and the exclude or filter category is set as Alpha, then only "123" will be transmitted to, or received at, the host computer. It is to be understood that filtered data can be scanned barcode data, asset information, a user defined string, and/or other information as described herein.

Still further, retail products can be identified with barcodes of various formats, some with embedded whitespace between fields of data, and/or others with alphabetic characters or special characters. Not all host protocols or store systems are able to process non-numeric data. Scanning these barcodes would cause a transmission error to occur.

However, a barcode scanner that can be configured with scripts to filter out whitespace or alphabetic or any other category of character data from the barcode data before transmission to a host device. The user can optionally define their own custom set of characters in the script that would be stripped out of the data.

For example, a store location needs to scan barcodes on products that have different formats, some with embedded spaces between fields, and/or others with alphabetic characters. All of these characters need to be stripped out before transmission. An scripts could be programmed in the scanner to remove selected types of characters from the data before transmission.

Accordingly, in some aspects, a barcode reader is described, comprising: a housing; an image-acquisition assembly positioned at least partially within the housing and having a field of view (FOV), the image-acquisition assembly operable to capture image data associated with an environment appearing within FOV; a communication module configured to interface with an external host; a controller communicatively coupled to the image-acquisition assembly and to the communication module, the controller configured to decode indicia appearing in the image data, wherein: the barcode reader is configurable to alternatively operate in one of at least two modes; in a first mode of the at least two modes the controller is configured to, responsive to successfully decoding an indicium, cause the communication module to transmit a first message to the external host, the first message including an unaltered payload encoded by the indicia; and in a second mode of the at least two modes the controller is configured to, responsive to successfully decoding the indicium, cause the communication module to transmit a second message to the external host, the second message including an altered payload encoded by the indicia, the altered message excluding at least one character that is at least one of not recognizable or not acceptable by the external host.

In such aspects, the altered payload may comprise a type selected from one or more of: non-printable data, whitespace data, numeric data, character data, or custom data.

Reduce Number of Rules.

In various aspects, a scanner system can be configured to implement scanner configuration regarding ADF rules and reduction thereof. The scanner system can comprise a scanner device (e.g., scanner device 100 or other data capture device) and one or more processors (e.g., processor(s) 202), which can be one or more processors of the scanner and/or host computer to which the scanner is connected. In addition the scanner system can comprise a memory (e.g., one or more memorie(s) 204) communicatively coupled to the one or more processors. The scanner may further comprise computing instructions stored on the memory that when executed by the one or more processors, cause the one or more processors to configure the scanner device with a criteria rule defining at least two criteria to be met before applying data formatting, wherein the criteria rule controls data formatting for at least one of: (a) scan data scanned by the scanner device; or (b) output of the scanner device. These settings may be configured or set in a GUI.

For example, in various aspects, a criteria rule may comprise a single ADF rule defining the at least two criteria. That is, multiple criteria may be supported within one ADF rule. In such aspects, the scanner device may be configured to have a single rule that has multiple criteria sections. If any of these sections are true, then the ADF rule applies and is executed.

Additionally, or alternatively, a criteria rules may comprise multiple rules wherein the at least two criteria are linked by Boolean logic. In such aspects, Boolean logic may be used to define the relation between criteria. In such aspects, within a criteria section, an explicit Boolean logic relationship between each pair of criteria can be defined. Such configuration will override any implied relationship between the two criteria.

Boolean logic such as "and"; "or"; "not"; "and not"; "or not"; may be defined between criteria or data. For example, some examples of Boolean logic include (A) an "or" based example: data or character length is 10 or it begins with 4, then signal true (otherwise signal false); (B) an "and" example: data or character starts with 4 and ends with a 9, then signal true (otherwise signal false); (C) a "not" example: code type is not code 128, then signal true (otherwise signal false); (D) an "and not" example: character or data length is 10 and not begins with 4, then signal true (otherwise signal false); and (E) an "or not" example: if scanned with hands-free method or not host is USB SNAPI, then signal true (otherwise signal false).

Replace Data with User Defined Character(s).

In various aspects, a scanner system can be configured to implement scanner configuration regarding replacing data with user defined characters. The scanner system can comprise a barcode reader (e.g., barcode reader 100 or other data capture device) and one or more processors (e.g., processor(s) 202), which can be one or more processors of the scanner and/or host computer to which the scanner is connected. In addition the scanner system can comprise a memory (e.g., one or more memorie(s) 204) communicatively coupled to the one or more processors. The scanner may further comprise computing instructions stored on the memory that when executed by the one or more processors, cause the one or more processors to configure the barcode reader to replace a data subset identified within scan data as scanned by the barcode reader.

For example, in one aspect, a data subset as replaced is of, or comprises, non-printable data. In such aspects, the scanner and/or host computer may be configured to replace unprintable characters in input data with a specified printable character. An ADF rule may configure the scanner and/or host computer to replace all non-printable characters within input data with a selected ASCII value. The input data can be either scanned barcode data, asset information or a user defined string. For example, a barcode reader and/or host computer may be configured to replace unprintable characters in the input data with a printable escape sequence (e.g., /x99) that shows what the unprintable data was (e.g., /x99 signifies a 2 digit hexadecimal representation of the unprintable character). As a further example, a barcode reader and/or host computer may be configured to select value 255 as a special case, where each non-printable character will be replaced with a 4-character escape sequence.

In another example aspect, a data subset as replaced is of, or comprises, ASCII data or characters. Such aspects, may be useful when a barcode reader is connected to a host computer that supports keyboard emulation. In such aspects, the barcode reader may be configured to replace any character of data to a specific sequence of keys being pressed on the simulated host keyboard. Such keys may include Tab or the Enter key, the F1 Key, Alt-C key combination, the Ctrl-Z combination, or other key(s) and/or key combinations.

In other aspects, replacement of all instances of an ASCII character with a specific keystroke can occur. For example, all HID Keystrokes (e.g., replace X with F12) can be replaced for matching ASCII format where only ASCII keystrokes are supported by a given host computer. For example, if the input data is "987, xyz,$$$" then an ADF rule configured for replacing the comma (",") with the "[F2]" key would cause the updated and replaced data "987 [F2]xyz [F2]$$$" to be transmitted to the host computer.

Still further, barcodes on IDs such as driver's licenses contain specially coded fields of data that are not printable. On some host devices when non-printable data is sent it may interfere with the host's distribution of the data in packet formats. Scanning these barcodes would likely cause a transmission error to occur.

However, A barcode scanner that can be configured with scripts to replace non-printable characters in barcodes with a specific printable character or an escape sequence that identifies the character by its hexadecimal value.

For example, a 2D barcode is scanned on the back of a Driver's License. The barcode contains dozens of fields of data, some of which are proprietary encrypted data. The connected host is not able to process non-printable data. To solve the problem, a script can be defined to change the non-printable data with an asterisk character. When the data is received, the asterisk shows where the original data was redacted.

Accordingly, in some aspects, the present disclosure describes a barcode reader comprising: a housing; an image-acquisition assembly positioned at least partially within the housing and having a field of view (FOV), the image-acquisition assembly operable to capture image data associated with an environment appearing within FOV; a communication module configured to interface with an external host; a controller communicatively coupled to the image-acquisition assembly and to the communication module, the controller configured to decode indicia appearing in the image data, wherein: the barcode reader is configurable to alternatively operate in one of at least two modes; in a first mode of the at least two modes the controller is configured to, responsive to successfully decoding an indicium, cause the communication module to transmit a first message to the external host, the first message including an unaltered payload encoded by the indicia; and in a second mode of the at least two modes the controller is configured to, responsive to successfully decoding the indicium, cause the communication module to transmit a second message to the external host, the second message including an altered payload encoded by the indicia, the altered message replacing at least one non-printable character contained within the payload with a respective printable character.

In some aspects, the non-printable character may comprise one or more of: non-printable data, American Standard Code for Information Interchange (ASCII) data, or data that would cause a host device or external host to generate error upon receipt of the non-printable character.

Replace a Specified Character in Barcode Data With a Key Sequence on the Host.

Still further, certain host devices support a keyboard emulation protocol. In cases when a barcode contains multiple fields of data, it is sometimes desirable to send each field to the host followed by a special key required by the host system. Examples are one of the F keys (F1, F2, F3 etc.) or an Alt shifted character (Alt A, Alt B, Alt C, etc.). A standard barcode scanner is not able to do this replacement unless there is special software within the unit.

However, a barcode scanner that can be configured with a script to replace a specified delimiter character in barcodes with a directive to the host driver to send a specific key sequence instead. This allows the scanner to function within the desired key sequences on a host system without having to write custom software on the scanner or the host system.

For example, a hang tag on a garment has three fields of data on it, a department number, a dash delimiter, a SKU number, a dash delimiter, and a price. The store system requires the F1 key be hit after the department and SKU fields. A script could be written to replace the dash characters in the barcode data with the F1 key. This allows the desired sequence of data to be sent without writing special software for the scanner or the host system.

Accordingly, in some aspects, the present disclosure describes a barcode reader comprising: housing; an image-acquisition assembly positioned at least partially within the housing and having a field of view (FOV), the image-acquisition assembly operable to capture image data associated with an environment appearing within FOV; a communication module configured to interface with an external host; a controller communicatively coupled to the image-acquisition assembly and to the communication module, the controller configured to decode indicia appearing in the image data, wherein: the barcode reader is configurable to alternatively operate in one of at least two modes; in a first mode of the at least two modes the controller is configured to, responsive to successfully decoding an indicium, cause the communication module to transmit a first message to the external host, the first message including an unaltered payload encoded by the indicia; and in a second mode of the at least two modes the controller is configured to, responsive to successfully decoding the indicium, cause the communication module to transmit a second message to the external host, the second message including an altered payload encoded by the indicia, the altered message replacing at least one non-printable character contained within the payload with a respective key sequence.

Ability to Parse Out Data Relative to the End of the Barcode.

Still further, in current scanner products, the script processing occurs from the start of the barcode data. Most of the operations, search, move from the start of the data towards the end. There is no facility to search for patterns in the reverse direction.

However, a barcode scanner with ADF capabilities that searches for patterns and moves the cursor in the reverse direction (from end of barcode data set, towards the front).

For example, a 2D barcode has a field of data that occurs an unspecified number of times. The user needs to extract the last instance of the field. A script can be programmed to search for the field marker "SKU=" starting from the end of the data.

Accordingly, in some aspects, the present disclosure describes a barcode reader comprising: a housing; an image-acquisition assembly positioned at least partially within the housing and having a field of view (FOV), the image-acquisition assembly operable to capture image data associated with an environment appearing within FOV; a communication module configured to interface with an external host; a controller communicatively coupled to the image-acquisition assembly and to the communication module, the controller configured to decode indicia appearing in the image data, wherein: the barcode reader is configurable to alternatively operate in one of at least two modes; in a first mode of the at least two modes the controller is configured to, responsive to successfully decoding an indicium, cause the communication module to transmit a first message to the external host, the first message including an unaltered payload encoded by the indicia; and in a second mode of the at least two modes the controller is configured to, responsive to successfully decoding the indicium, cause the communication module to transmit a second message to the external host, the second message including an altered payload encoded by the indicia, the altered message excluding a predefined number of characters, the predefined number of characters appearing at least one of at a beginning of a string or at an end of the string that forms the payload.

Eliminate Unwanted Data.

In various aspects, a scanner system can be configured to implement scanner configuration regarding eliminating unwanted data. The scanner system can comprise a scanner device (e.g., scanner device 100 or other data capture device) and one or more processors (e.g., processor(s) 202), which can be one or more processors of the scanner and/or host computer to which the scanner is connected. In addition the scanner system can comprise a memory (e.g., one or more memorie(s) 204) communicatively coupled to the one or more processors. The scanner may further comprise computing instructions stored on the memory that when executed by the one or more processors, cause the one or more processors to configure the scanner device to delete a data subset identified within scan data as scanned by the scanner device.

In various aspects, the data subset to be deleted can be one or more of: a number of characters identified based on a position within the scan data, a number of characters outside two positions within the scan data, or a specified data pattern. In various aspects, input data for elimination or removal can be either scanned barcode data, asset information or a user defined string. Further, if string length as full is selected, then up to 4095 characters can be removed. If not (e.g., compact is selected), up to 252 characters can be removed.

In one example, an ADF rule may erase a certain number of characters (e.g., "N" characters) between two positions, such as removing 5 characters beginning at a given position (e.g., $7^{th}$ character or position) within scan data or otherwise input data.

In another example, an ADF rule may erase a number characters from the end of the input data from scan data or otherwise input data. For example, if the input data is 123abc, and N is 3 characters, then only 123 will be transmitted to the host computer.

In some examples, a same action may be sent as part of a single action (e.g., instead of multiple actions). Such action may be defined in an ADF rule for efficiently repeating a send action. This ADF rule repeats the next send value or send keycode, N number of times. For example, if Repeat Next Action is 3, and send keycode is Tab, then the value "Tab Tab Tab" will be transmitted.

In one example, an ADF rule may remove leading characters. For example, this action may remove all leading instances of the selected character from the input data. For example, if a barcode contains 00000123456 and this action is configured to remove "0", the output data will be 123456.

In another example, an ADF rule may remove trailing characters. For example, this action may remove all trailing instances of the selected character from the input data. For example, if the barcode contains 12345600000 and this action is configured to remove "0", the output data will be 123456.

In another example, an ADF rule may cause a single or first pattern of characters to be removed or deleted. This may comprise deleting a string from scanned data (e.g., skip ahead 3 characters and delete next 4 characters). In addition, this action, as defined by the ADF rule, may cause deletion of the first occurrence of the specified pattern, in the input data.

In another example, an ADF rule may cause all patterns of characters to be removed or deleted. This may comprise deleting all patterns of a string from scanned data (e.g., delete all 4 characters "xxxx" in scan data). This action, as defined by the ADF rule, may cause deletion of all occurrence(s) of the specified pattern, in the input data.

In another example, an ADF rule may cause trimming or deletion outside two positions within scan data. This may comprise deleting one or more characters. For example, an instruction to send data from position "X" to position "Y" in the barcode scan would cause data trimming. That is, this action, as defined by the ADF rule, may cause trimming (removing) of characters outside the selected start and end positions.

Simplified Cursor Movement Like Skip, Move Cursor Location.

In various aspects, a scanner system can be configured to implement scanner configuration regarding cursor movement of a barcode reader. The scanner system can comprise a barcode reader (e.g., barcode reader 100 or other data capture device) and one or more processors (e.g., processor(s) 202), which can be one or more processors of the scanner and/or host computer to which the scanner is connected. In addition the scanner system can comprise a memory (e.g., one or more memorie(s) 204) communicatively coupled to the one or more processors. The scanner may further comprise computing instructions stored on the memory that when executed by the one or more processors, cause the one or more processors to configure the barcode reader to move a cursor of the barcode reader to a cursor position within scan data scanned by the barcode reader.

In such aspects, moving the cursor positon comprises one or more of: moving the cursor to a selected position from a start of the scan data, moving the cursor back by a number of characters from an end of the scan data, moving the cursor backwards until it reaches a matching pattern, or moving the cursor backwards until it reaches a matching character.

For example, movement may comprise movement of the cursor to a precise location at the beginning of the barcode data. An ADF rule may cause a barcode reader to move the scan cursor to the selected position, from the start of input data. For example, if the cursor is on position 13 of the input data, and the start position is set to 6, the cursor would now be on position 6, i.e., the $6^{th}$ character of the input data.

As another example, movement of the cursor may comprise movement to a precise location at the end of the barcode data. An ADF rule may cause a barcode reader to move the scan cursor to the selected position, from the end of input data. For example, if the input data is 1234567abc, and N is 3 characters, then cursor is now on the "a" character in the character string.

Additional Considerations

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A barcode reader comprising:

a housing;

an image-acquisition assembly positioned at least partially within the housing and having a field of view (FOV), the image-acquisition assembly operable to capture image data associated with an environment appearing within FOV;

a user-feedback assembly operable to provide a plurality of user-feedback responses; and a controller communicatively coupled to the image-acquisition assembly and to the user-feedback assembly, the controller configured to decode indicia appearing in the image data, wherein:

the barcode reader is configurable to alternatively operate in one of at least two modes;

in a first mode of the at least two modes the controller is configured to (i) instruct the user-feedback assembly to generate a first type of user-feedback response responsive to successfully decoding a first type of indicia, and (ii) instruct the user-feedback assembly to generate the first type of user-feedback response responsive to successfully decoding a second type of indicia;

in a second mode of the at least two modes the controller is configured to (i) instruct the user-feedback assembly to generate a second type of user-feedback response responsive to successfully decoding the first type of indicia and (ii) instruct the user-feedback assembly to generate a third type of user-feedback response responsive to successfully decoding the second type of indicia;

the first type of indicia is different from the second type of indicia;

the second type of user-feedback response is different from the third type of user-feedback response;

the second type of user-feedback response is one of different from or same as the first type of user-feedback response responsive; and a parameter(s) for defining the first type of indicia and the second type of indicia being at least one of predefined within the controller or user-defined.

2. The scanner system of claim 1, wherein the user-feedback response comprises one or more of: an audible feedback, a visual feedback, or a tactile feedback.

3. The scanner system of claim 1, wherein the user-feedback response is dependent on the context of a scanned barcode, the context selected from at least one of: symbology, length, or presence of unique string in scan data.

4. The scanner system of claim 1, wherein the indicia comprises one or more of: a positive scan result, a negative scan result, or a scan failure.

* * * * *